United States Patent [19]
Rolefson

[11] 3,822,480
[45] July 9, 1974

[54] POSITION LOCATING DEVICE

[76] Inventor: Jerome F. Rolefson, W220 N6755 Townline Rd., Sussex, Wis. 53089

[22] Filed: Nov. 10, 1972

[21] Appl. No.: 305,572

[52] U.S. Cl.................................. 33/280, 356/146
[51] Int. Cl......................... G01c 1/00, G01c 21/00
[58] Field of Search............ 33/262, 276, 277, 278, 33/279, 280, 286; 356/253, 254, 255, 146

[56] References Cited
UNITED STATES PATENTS

| | | | |
|---|---|---|---|
| 807,153 | 12/1905 | Clark | 33/280 |
| 2,679,105 | 5/1954 | Herrick | 33/277 |
| 3,217,415 | 11/1965 | Madden | 356/146 |

FOREIGN PATENTS OR APPLICATIONS

| | | | |
|---|---|---|---|
| 11,327 | 5/1909 | Great Britain | 356/146 |
| 13,026 | 6/1908 | Great Britain | 256/146 |

Primary Examiner—Louis R. Prince
Assistant Examiner—Richard R. Stearns
Attorney, Agent, or Firm—Henry C. Fuller

[57] ABSTRACT

A position locator or homing device for use by fishermen, divers, etc, includes a view finder for directly observing one landmark and adjustable mirrors for reflecting images of other landmarks into the view finder for simultaneous viewing of three landmarks. The position locator also includes scales for recording the angular position of the reflected landmarks to enable pre-setting the adjustable mirrors at the recorded angle so that the user can subsequently find the position of the previous fix. Hairline indicator pins mounted on swing arms and spaced from the mirrors enable accurate recording of the relative angular position of the reflected landmarks and are employed to subsequently locate the position of the fix.

7 Claims, 6 Drawing Figures

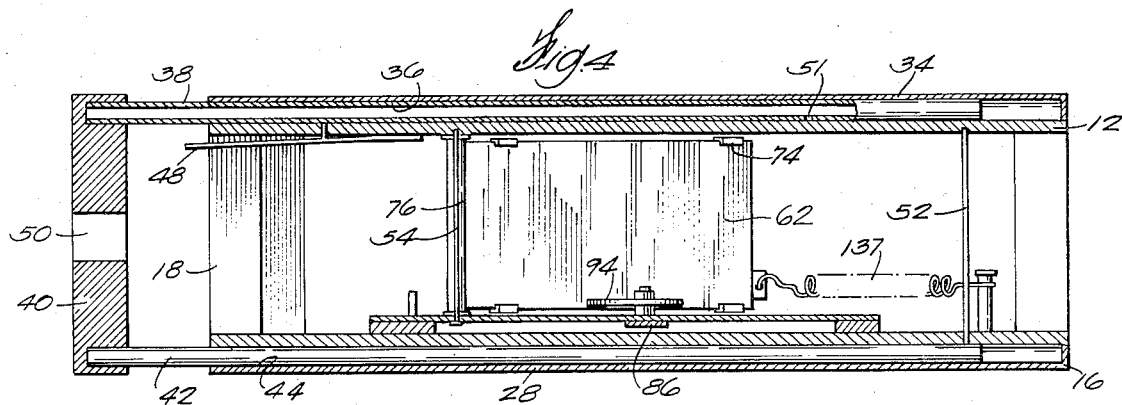
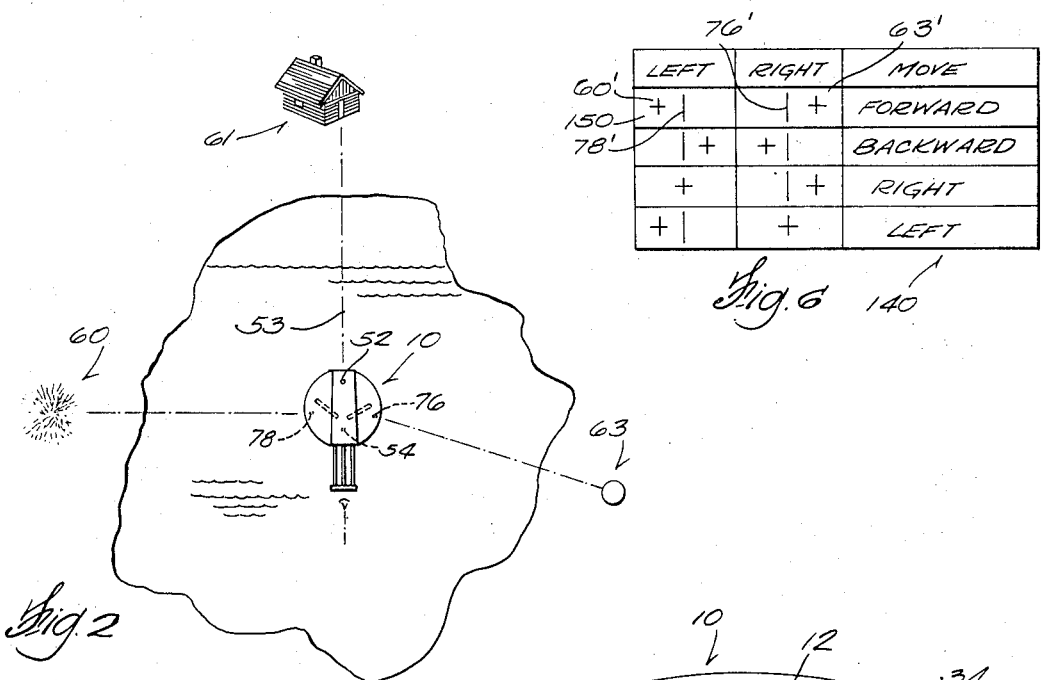
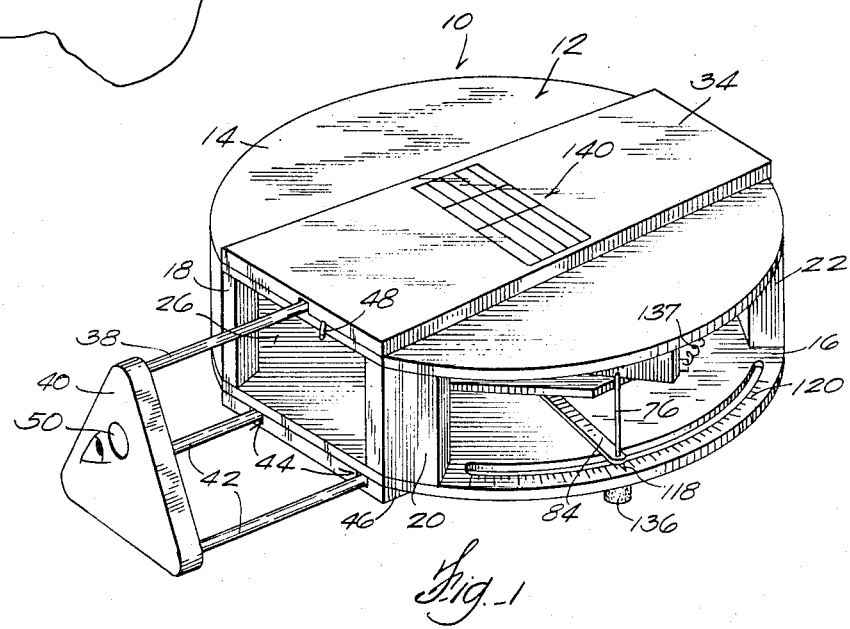

POSITION LOCATING DEVICE

BACKGROUND OF INVENTION

Navigational aids are available for use with navigational charts for determining the position of a ship upon a chart upon obtaining readings of the horizontal angles between three landmarks. A device of this type is shown in the patent to Madden U.S. Pat. No. 3,217,415. The present invention is intended for use without any chart and to enable the user to return to a desired position by using recorded data obtained with the position locator before leaving the position to which the operator intends to return.

SUMMARY OF INVENTION

The position locator includes a housing having a view finder opposite a central window to form a direct sight path with two side windows adjacent the sight path. Mirrors are pivotally mounted within each side window to reflect images of selected landmarks for simultaneous viewing of three landmarks through the view finder. Vertical hairline or indicator pins are spaced from each of the mirrors and are supported on swing arms which are pivotally mounted to the housing and fixed to cams having a cam surface which engages the rear or nonreflecting surface of the mirrors. The curvature of the cams is such that when viewed through the eyepiece, the indicator pins remain at a substantially fixed position relative to the side edges of the mirrors irrespective of the position of the mirrors. The apparent angle of separation of the reflected images remains at a constant small angle, no matter what the actual angle of separation of the reflected images is relative to the sight path through the central window. This greatly facilitates simultaneous observation of three landmarks. Moreover, the observed position of indicator pins on the mirrors is such that images are observable in the mirrors on both sides of the pins.

The swing arms also have pointers beneath the indicator pins which cooperate with scales on the housing so that angular readings of the reflective images may be taken and recorded when obtaining a fix on three landmarks at a site to which the operator intends to return. When the operator is attempting to return to the desired position, he pre-sets the swing arms at the prerecorded scale readings and then makes observations with the position locator and moves about until the three landmarks constituting the previous fix are simultaneously viewable through the eyepiece and in registry with the sight pins.

The position locator can also include a table to indicate to the operator the direction of movement of the operator and his vessel required when seeking the position of the prerecorded fix. For instance, the table indicates that if the reflected landmark image is to the operator's left of a side window indicator line, the operator must move forward to find the position. If the reflected images are to the right of the indicator line, the operator must move backward to find the position of the fix.

Further objects, advantages and features of the present invention will become apparent from the following disclosure.

DRAWINGS

FIG. 1 is a perspective view of a position locator in accordance with the invention.

FIG. 2 is a diagrammatic view showing the position locator in reduced scale and in use.

FIG. 4 is a sectional view taken along line 4—4 of FIG. 3.

FIG. 6 is a diagram of a scale used to determine directions of movement of operation required to locate position of prior fix.

DETAILED DESCRIPTION OF PREFERRED EMBODIMENT

Figure 3:
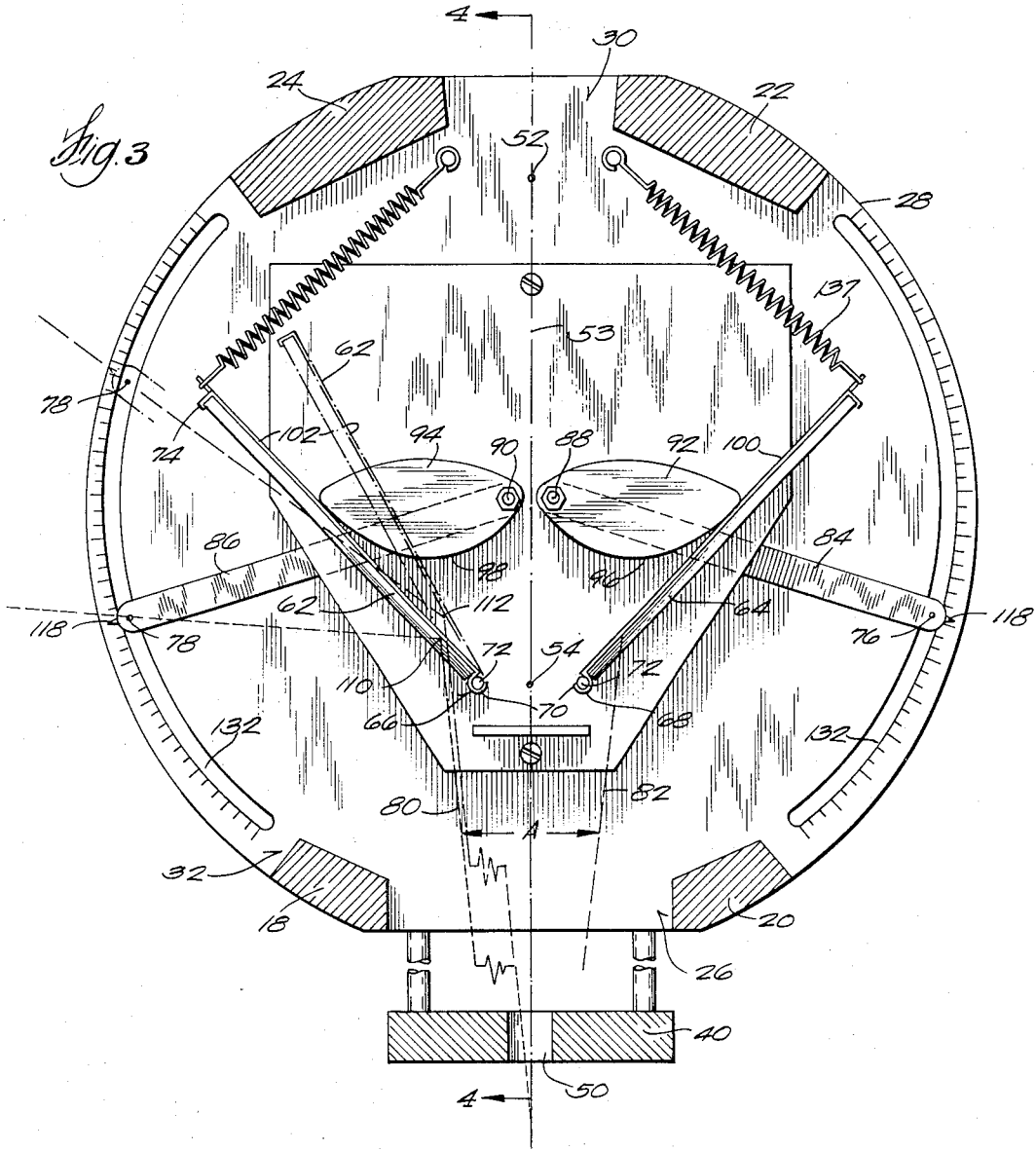
FIG. 3 is an enlarged plan view with the top removed of the position locator shown in FIG. 1.
Figure 5:
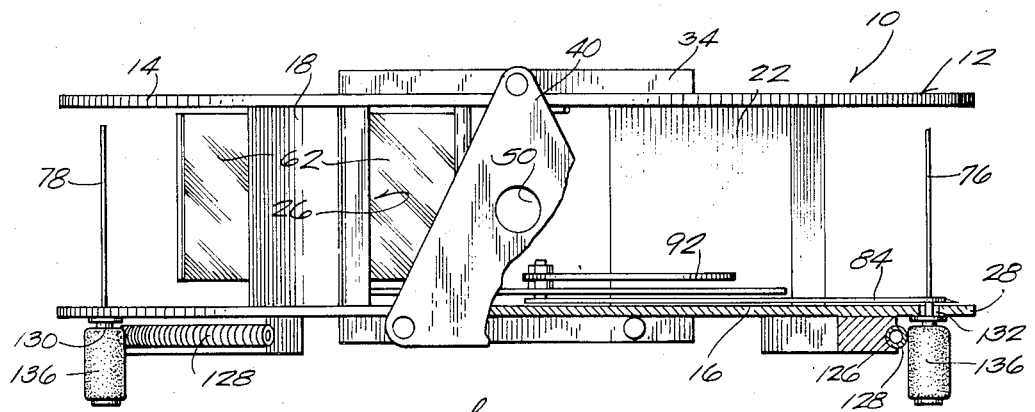
FIG. 5 is a side elevational view of the position locator shown in FIG. 3.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

In the drawings, FIG. 1 shows a position locator 10 having a generally circular housing 12 with a top 14 and bottom 16 separated by mounting blocks and spacers 18. In the disclosed embodiment (FIG. 3) there are four spacers 18, 20, 22 and 24. The spacers 18 and 20 define an opening or window 26, and the spacers 20 and 22 define a side window 28. The spacers 22 and 24 define the side edges of a window 30 opposite the window 26. The spacers 24 and 18 define the side edges of a second side window 32. The housing also includes a top plate 34 (FIG. 1) with a channel 36 which telescopically receives a rod 38 which is connected to a radially adjustable eyepiece or view finder 40. The view finder 40 is also connected to two lower rods 42 which are telescopically received in channels 44 formed in a lower plate 46. A latch 48 with a projection 51 can be provided to extend into the channel and lock the view finder 40 in the extended position for use shown in FIG. 1. The collapsed position of the view finder is for purposes of storage.

The view finder 40 has an aperture 50 which is centered on a sight path 53 defined by hairline or indicator pins 52 and 54 (FIG. 3).

To afford simultaneous observation of three landmarks such as 60, 61 and 63 (FIG. 2), the position locator includes a first mirror 62 and a second mirror 64. Means are provided for pivotally supporting the mirrors 62 and 64 on the housing 12 for movement in an arc in the windows respectively 32 and 28. In the disclosed construction, the means includes mirror mounting brackets 66 and 68 with integrally formed hinge portions 70 which receive upstanding hinge pins 72 fixed between the top and bottom walls. The mounting brackets 66 and 68 also have tabs 74 which are bent around the edges of the mirror to securely hold the mirrors to the brackets 66 and 68.

To provide accurate alignment of the mirrors with the images of landmarks 60 and 63 (FIG. 2), the position locator includes a hairline or indicator pin 76 and a hairline indicator 78, with the indicators 76, 78 spaced from the associated mirrors. Means are provided for supporting the indicator pins and simultaneously moving the pins and mirrors so that the angle A between the ray paths 80, 82 of the reflected images (FIG. 3) remains substantially constant. In the disclosed construction, the means includes swing arms 84 and 86 which are respectively pivotally mounted to the housing by posts 88 and 90 and cams 92 and 94 which are fixedly connected to the swing arms 84 and 86. The cams 92 and 94 have cam surfaces 96 and 98 which engage the rear surfaces 100 and 102 of the mirrors. The curvature of the cam surfaces 96 and 98 is such that the observed position of the hairline indicators 76, 78 on the mirror remains the same. The indicator pins 76, 78 remain at the same observed position with respect to the side margins of the window 26 no matter what the actual position of the swing arms and indicator pins. Thus the indicator pins 76, 78 do not appear from view or reduce the view. For instance, the position of the image of the hairline pin 78 on the mirror 62 in FIG. 3 and in solid lines is at point 110. FIG. 3 also shows the mirror 62 in broken lines at a different angle relative to the sight path 53. The position of the image of the indicator pin 78 is at 112 although the position of the mirror has changed. Thus, the apparent position of the indicator pins remains constant to greatly facilitate use of the position locator in lining up three images for a fix. The angle A between the ray paths of the reflected images also is relatively small so that the three landmarks are easily viewed at one time. In addition, the use of the cams and the constant position of the sight indicator pins with respect to the borders of the mirrors insures mirror surfaces on either side of the image of the indicator pins to facilitate determining the location of the pre-recorded fixed position as subsequently described.

Each of the swing arms 84 and 86 is provided with a pointer 118 which cooperates with a scale 120 which can be provided with a linear scale with indicia for recording the angular positions with reflected images for later use.

Retaining means are also provided for maintaining the swing arms in a stable position during use. In the disclosed construction, the means comprises a curved rod 126 located on the undersurface of the housing, which is provided with corrugations or threads 128. The swing arms are provided with shafts or posts 130 which extend through arcuate slots 132 in the housing bottom wall. Rollers 136 on the shafts frictionally engage the corrugated or threaded rods 126. The rollers are pressed against the rods so that rotation of the roller is required to move the swing arms.

Springs 137 bias the mirrors 62, 64 against the cams 92, 94 and maintain the engagement of the cams and mirrors during movement of the swing arms 84, 86.

FIG. 6 shows a table which is desirably located at 140 on the top of the housing. The table is of assistance in using the position locator when attempting to return to the position at which a fix was previously recorded. In use of the position locator, to locate the position of the pre-recorded fix, the swing arms 84, 86 are adjusted to the recorded angular position and the operator moves his vessel to the approximate area of the fix and slows down his vessel to take a running fix with the pins 52, 54 aligned with the landmark 61, to see whether the images of landmarks 60 and 63 register with the indicator pointers 76 and 68. In the table, the vertical column entitled "left" refers to the left indicator pin 78, the column entitled "right" refers to the indicator pin 76. The line 76' represents the indicator pin 76. The line 78' indicates the pin 78. The mark 60' indicates the observed position of the image of the selected landmark on the mirror relative to the position of the indicator pointer 78 on the mirror. The mark 63' represents the observed position of the image of the landmark 63 relative to the pin 76. Thus, if the operator of the device observes the landmark 60 to the left of indicator pin 78 and to the right of indicator pin 76, as shown in horizontal column 150 of the table, this means that the operator must move forward to find the position of the pre-recorded fix. The other horizontal rows indicate other movements of the vessel required when observing the reflected images in other positions relative to the sight indicators.

What is claimed is:

1. A position locator including a housing having a view finder and a central window spaced from said view finder and a hairline indicator arranged to define a sight path through said central window and said view finder, oppositely disposed side windows in said housing located on the sides of said sight path, first and second mirrors pivotally mounted to said housing, adjustment means affording independent movement of each of said mirrors in an arc to reflect ray paths of images to said view finder, said means including a swing arm associated with each mirror having a pointer cooperating with an associated scale on said housing, the scales having indicia to enable later readjustment of the arms to recorded positions and including an indicator pin supported on each swing arm remotely from the associated mirror and wherein said adjustment means affords movement of each of said mirrors upon movement of the associated swing arm so that the angle between the ray paths of reflected images at the view finder and in registery with said indicator pins remains substantially constant notwithstanding change in the actual angular position of the mirrors relative to said sight path.

2. A position locator in accordance with claim 1 wherein said adjustment means includes a cam connected to each of said swing arms, said cams having a cam surface engagable with each of said mirrors and means for biasing said mirrors against said cam surfaces.

3. A position locator in accordance with claim 2 wherein said biasing means includes springs connected to said mirrors and to said housing, said springs being under tension at all points in the arc of travel of said mirrors.

4. A position locato in accordance with claim 1 wherein said view finder comprises wall means defining an aperture and means connecting said wall means to said housing to afford movement of said wall means between an extended position for use and a retracted position for storage.

5. A position locator in accordance with claim 1 including retaining means on each of said swing arms cooperating with means on said frame to afford positive control of movement of said swing arms and retain said swing arms in adjusted positions.

6. A position locator in accordance with claim 5 wherein said retaining means on said swing arms comprises posts connected to said swing arms and rollers on said posts, and said means on said housing includes a surface on said housing in pressure engagement with said rollers.

7. A position locator including a housing having a view finder adjustable towards and away from said housing and a viewing window spaced from said view finder, side windows in said housing, first and second mirrors, each of said mirrors pivotally mounted on said housing for movement in an arc associated with each of said windows for reflecting images of landmarks to said view finder for simultaneous viewing of three landmarks through said view finder, an indicator pin asscoaited with each of said mirrors and means for mounting each of said indicator pins on said housing for pivotal movement about an axis spaced from the axis of the associated mirror and means for simultaneously moving each of said mirrors and the associated indicator pin about their respective axes to maintain each of said indicator pins at the same apparent position relative to the edge of the associated mirror as observed through said view finder notwithstanding change of position of said mirrors, said last named means indicating the position of each mirror.

* * * * *